(No Model.)

P. C. ZIMMERMAN.
GATE HINGE.

No. 414,932. Patented Nov. 12, 1889.

WITNESSES:
Fred J. Dietrich
Geo. H. Evans

INVENTOR:
P. C. Zimmerman
BY
ATTORNEYS

UNITED STATES PATENT OFFICE.

PETER C. ZIMMERMAN, OF SHIREMANSTOWN, PENNSYLVANIA.

GATE-HINGE.

SPECIFICATION forming part of Letters Patent No. 414,932, dated November 12, 1889.

Application filed June 28, 1889. Serial No. 315,881. (No model.)

*To all whom it may concern:*

Be it known that I, PETER C. ZIMMERMAN, of Shiremanstown, in the county of Cumberland and State of Pennsylvania, have invented new and useful Improvements in Gate-Hinges, of which the following is a full, clear, and exact description.

The invention consists of certain novel constructions, arrangements, and combinations of elements which will be hereinafter fully described, and specifically pointed out in the claims.

Reference is to be had to the accompanying drawings, forming a part of this specification, in which similar figures and letters of reference indicate corresponding parts in all the views.

Figure 1:
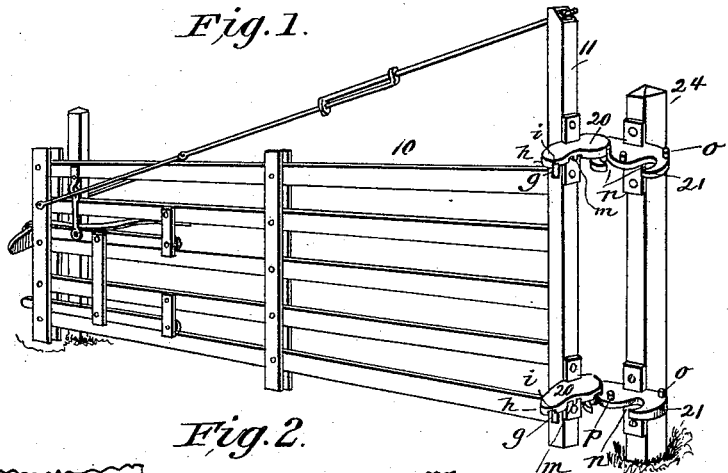
Figure 2:
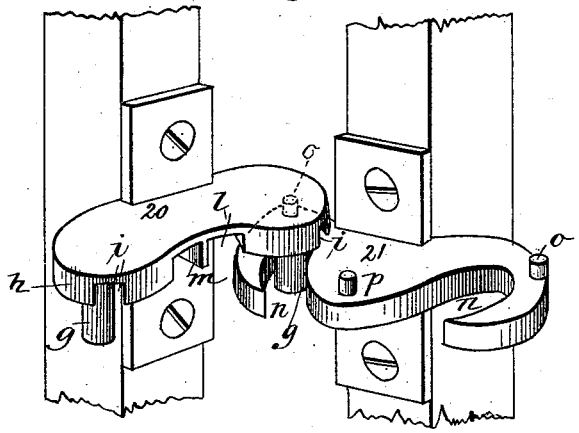
Figure 3:
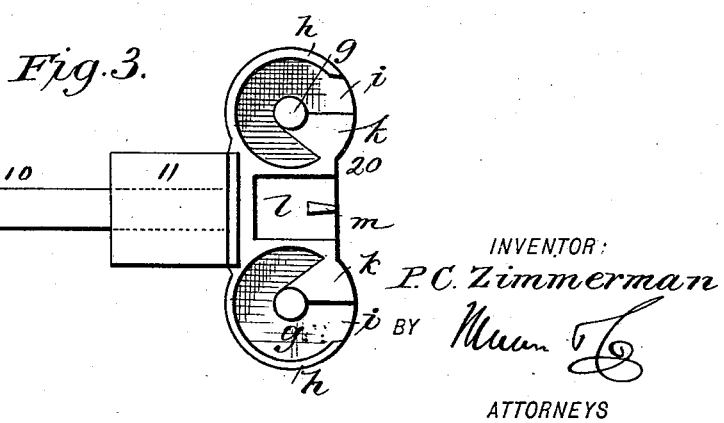

Figure 1 is a perspective view of a gate with my improved hinges applied. Fig. 2 is an enlarged view of the hinge with portions of the inner gate-bar and gate-post, and Fig. 3 is a plan of the upper leaf of the hinge.

10 represents a gate, 11 the inner vertical bar thereof, and 24 the post to which the gate is hinged.

The hinge-section carried by the gate is shown in detail at 20 in Figs. 1 and 2, said sections being formed with two downwardly-extending pintles $g$, about which there are concentric flanges $h$, that are apertured at $i$, the flanges being connected to the pintles by projections $k$. Between the pintles $g$ there is a recess $l$, and within the recess there is a downwardly-extending projection $m$.

The hinge-post sections 21 are formed with recesses $n$ and with upwardly-extending projections $o$ $o$ and $p$. When the two hinge-sections are applied and the gate is in the closed position, the pintles $g$ rest within the recesses $n$, the projection $p$ being at this time in advance of the projection $m$. If now the gate be turned, for instance as represented in Fig. 1, the pintle $g$ upon the right will enter the recess $n$ upon the right, and the projection $o$ will pass through the aperture $i$ and into the annular space between the pintle and its concentric flange $h$.

Having thus described my invention, I claim as new and desire to secure by Letters Patent—

1. The combination, with hinge-section 20, formed with pintles $g$, and flanges $h$, having apertures $i$, of hinge-section 21, formed with recesses $n$ and projections $o$, substantially as described.

2. The combination, with hinge-sections 20, formed with pintles $g$, flanges $h$, having apertures $i$, and a central recess $l$, in which there is a projection $m$, of hinge-sections 21, formed with recesses $n$ and projections $o$ $o$ and $p$, substantially as described.

PETER C. ZIMMERMAN.

Witnesses:
M. D. KALBACH,
H. H. MERCER.